Aug. 9, 1938.  D'ARCY A. YOUNG, JR  2,126,302
PHOTOGRAPHIC SHUTTER CONTROL
Filed Oct. 21, 1936   2 Sheets-Sheet 1
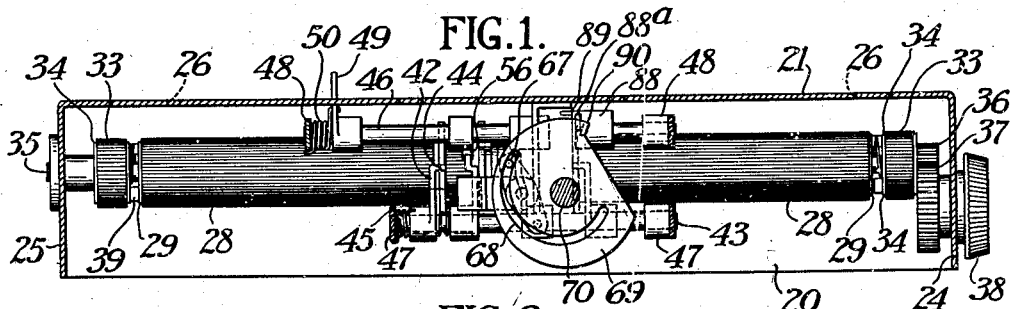
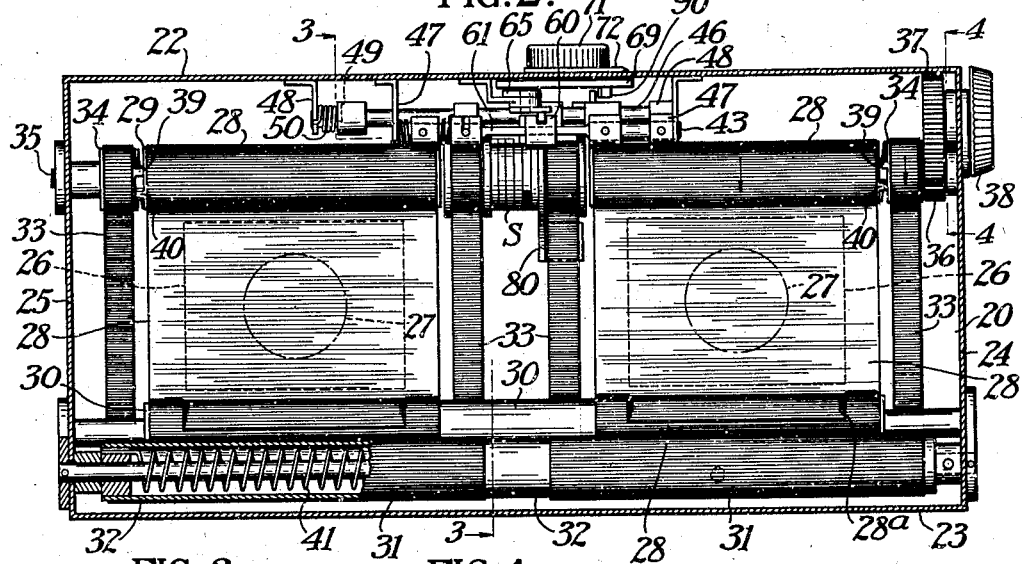
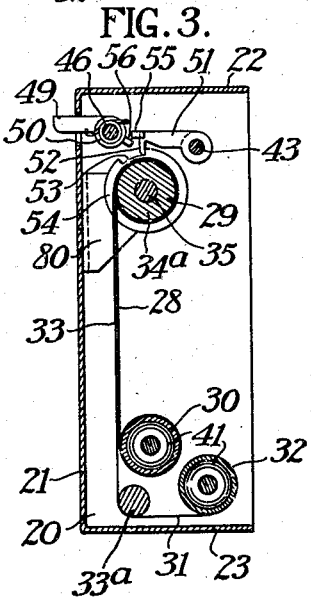
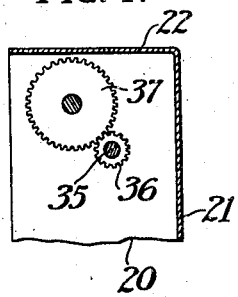
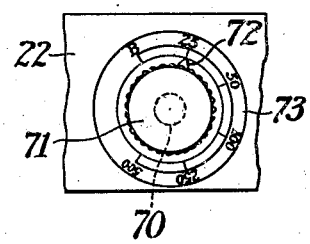
INVENTOR.
D'Arcy A. Young, Jr.
BY
ATTORNEYS Aug. 9, 1938.   D'ARCY A. YOUNG, JR   2,126,302
PHOTOGRAPHIC SHUTTER CONTROL
Filed Oct. 21, 1936   2 Sheets-Sheet 2
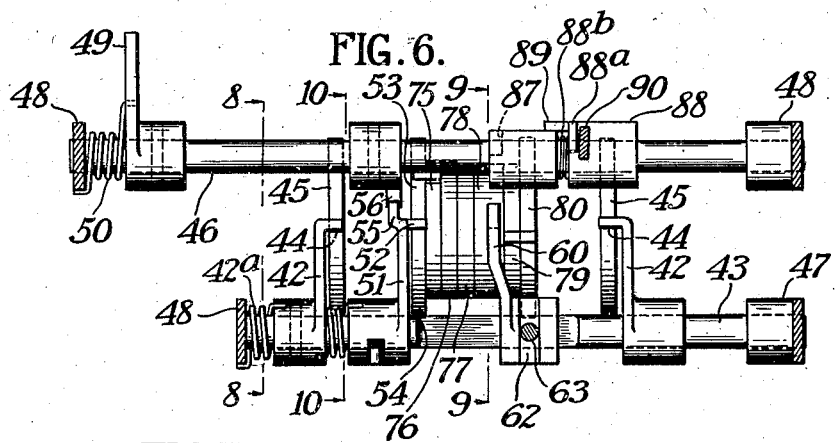
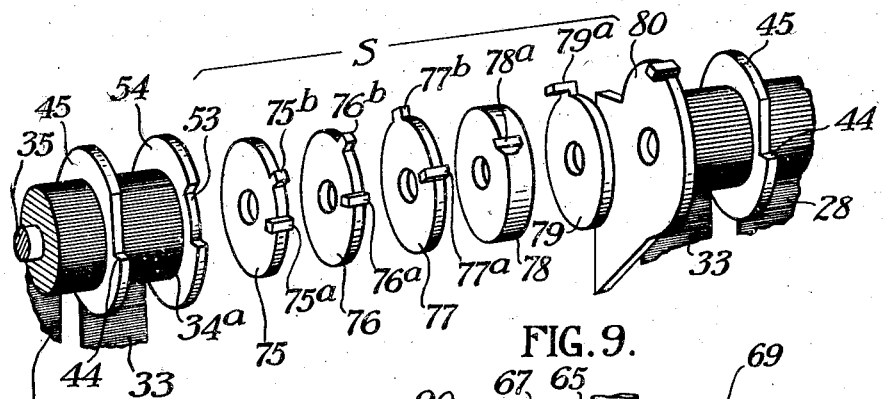
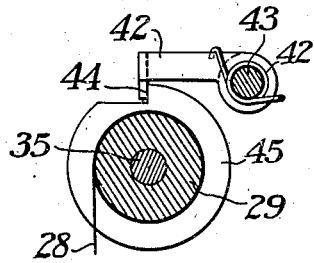
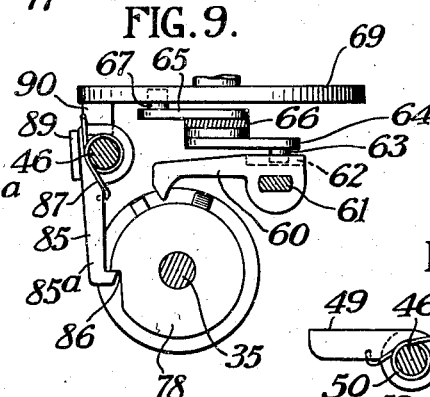
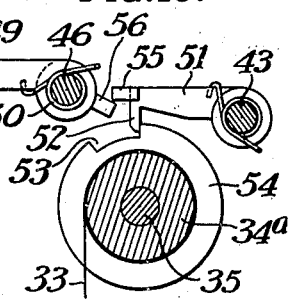
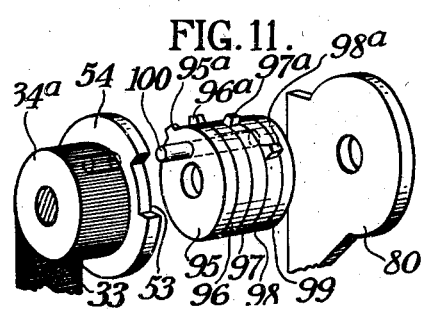
INVENTOR.
D'Arcy A. Young, Jr.
BY
ATTORNEYS Patented Aug. 9, 1938

2,126,302

UNITED STATES PATENT OFFICE 2,126,302

PHOTOGRAPHIC SHUTTER CONTROL

D'Arcy A. Young, Jr., Rochester, N. Y., assignor to Eastman Kodak Company, Rochester, N. Y., a corporation of New Jersey Application October 21, 1936, Serial No. 106,831

9 Claims. (Cl. 95—57)

This invention relates to photography and more particularly to photographic shutters. One object of my invention is to provide a photographic shutter in which shutter members are adapted to cover and uncover an exposure aperture, and in which separate power springs are used to drive the shutter members positively to both open and close the exposure aperture. Another object of my invention is to provide a shutter with separate power drives for opening and closing the shutter, and to provide a means for determining the duration of exposure by a timing mechanism, permitting one spring to function in advance of the other. Still another object of my invention is to provide a shutter structure in which a timing mechanism for controlling the relative operation of two power springs consists of a lost motion connection, the duration of the lost motion of which can be regulated. Another object of my invention is to provide a control mechanism consisting of a plurality of protuberances rotating in timed relation, any one of which may be engaged by a trip mechanism for controlling the time of a shutter exposure. Another object of my invention is to provide a shutter of the curtain type in which two shutter members may be driven by two springs, and in which mechanism is included for permitting the operation of one spring in advance of the operation of the other spring. Another object of my invention is to provide a curtain shutter with a means for simultaneously setting two power springs and with a means for tripping said springs one after the other. Still another object of my invention is to provide a means for varying the time of exposure through a lost motion connection comprising a series of rotatable toothed disks, and to provide a means for cooperating with these adapted to trip the shutter closing spring, and other objects will appear from the following specification, the novel features being particularly pointed out in the claims at the end thereof.

As one form of my invention I have illustrated a shutter which has been constructed for use with stereo cameras in which a pair of objectives are used. However, while the illustrations show a preferred embodiment of my invention in which two shutters are used side by side, my invention is equally useful for a single shutter and camera employing only the more common single objective, since exactly the same control device is used for one shutter as is used for the double shutter in the embodiment illustrated herein.

Figure 1 is a plan view, partially in section;

Figure 2 is a front elevation of Figure 1 with parts being shown in section;

Figure 3 is a vertical section on the line 3—3 of Figure 2;

Figure 4 is a fragmentary section on line 4—4 of Figure 2;

Figure 5 is a top plan of the speed scale and index;

Figure 6 is an enlarged plan view of the speed selector mechanism;

Figure 7 is a perspective view of the speed selector stops and other adjacent parts "exploded";

Figure 8 is a detail section on line 8—8 of Figure 6;

Figure 9 is a detail section on line 9—9 of Figure 6;

Figure 10 is a detail section on line 10—10 of Figure 6, and

Figure 11 is a perspective view of a modified detail.

One of the chief features of my invention is the control mechanism which is interposed between two latches controlling two power drives, one drive being adapted to move the shutter members so that the exposure aperture will be opened, and the other drive being adapted to move the shutter members so that the exposure aperture will be closed. Thus, I prefer to use two springs, one for opening the shutter and the other for closing the shutter, and I prefer to vary the timing of these two springs by a lost motion connection, the duration of which can be altered at will.

In the illustrated embodiment of my invention the shutter members may conveniently be curtains which are commonly used in the so-called focal plane type of shutters.

Since I have shown a shutter housing containing two shutters and two exposure apertures, I wish to point out that the following description refers to one shutter only, except where otherwise specifically stated. The two shutter structures are identical and a description of one will be sufficient for both and is preferable because I also contemplate making a single shutter with exactly the same control mechanism which is illustrated and which, in the present embodiment of my invention, is used for both shutters. It is, of course, necessary in stereo shutters to have both give exactly the same exposure.

The operating mechanism of the shutter is shown enclosed within a housing or case 20 having a back 21 and top and bottom walls 22 and 23, respectively, and end walls 24 and 25. Means, not illustrated, are provided for mounting the case in or on a camera, and when mounted, the back 21 is preferably close to the focal plane. Apertures 26 in the back 21 are located in the required positions and concentric with the twin lenses. The latter are not shown in the drawings, their positions being merely indicated by broken-line circles at 27.

The curtains of the shutter are arranged in duplicate to cover the apertures 26 and to pass across said apertures in unison when being wound and when released. The duplicate curtains are preferably spaced apart sufficiently to afford room for the timing selector, which in the drawings is designated broadly by the letter "S". In the following description of the curtains the operation of one applies also to the other, and the various corresponding parts of the duplicate assemblies bear the same reference numerals.

The front curtain 28 is wound on a roller 29 and on a spring-actuated return roller 30. This curtain has an aperture 28a of the same dimensions as aperture 26 in the back wall 21. The rear curtain 31 is wound on a spring-actuated roller 32 below and in front of the roller 30, and the upper portion of this curtain terminates in tapes 33 which are attached to and wound on drums 34 and 34a, which are fixed to shaft 35 on which roller 29 is freely revoluble. The tapes also pass over an idler roll 33a.

The shaft 35 carries a pinion 36 that meshes with a gear 37 attached to a winding knob 38. When the latter is rotated in the direction indicated in Fig. 2, the shaft 35 turns the drums 34 and 34a and begins to wind up the rear curtain 31 by means of the tapes 33. The drum 34 carries a lug 39 that strikes a similar lug 40 on the roller 29 after the drum 34 has turned a small part of one revolution, or a distance sufficient to carry the upper edge of curtain 31 past the upper edge of aperture 28a in the front curtain. Further winding of the knob completes the movement of both curtains to the "set" position, indicated in Fig. 3. In this position both the roller 29 and the drums 34 and 34a are urged toward the direction opposite to the arrows in Fig. 2, by torsional coil springs within the rollers 30 and 32, as shown at 41 in Figs. 2 and 3. The curtains are held in the wound or set position by a latch 42 (Fig. 6) mounted on a shaft 43, and which engages a shoulder 44 on the end flange 45 of roller 29.

The shaft 43 and a parallel shaft 46 near the back of the casing 20 carry a series of detents in the form of arms or hooks, some of which are free on these shafts and some fixed thereto, as will be described. Shaft 43, hereinafter designated as the detent shaft, is supported on bearings 47, while the shaft 43, or release shaft, may be turned in bearings 48 by downward movement of a release lever 49 that is fixed to said shaft, against the action of a spring 50.

On the detent shaft 43 and free to turn thereon, is a detent 51, the hooked end 52 of which drops into a notch 53 in the end flange 54 of drum 34a, to retain the rear curtain in "wound" position (Fig. 10). An extension 55 on the detent 51 projects into the path of an arm 56 which is fixed to shaft 46, so that when the lever 49 is depressed, the arms 56 will raise the detent 51 and free the hook 52 from the notch 53, thereby permitting the rear curtain 31 to be returned to the "unwound" position of Fig. 11.

Means are presently to be described whereby a "slot" may be formed between the upper edge of the rear curtain 31 and the lower edge of the front curtain 28, releasing the latter at a preselected interval after the curtain 31 has started downward to uncover the exposure aperture 26. One element of said means comprises a hooked trip lever 60 that fits and is slidable on a flattened portion 61 of shaft 43, although this is a detail of construction that may be modified, and might, for instance, be a spline key or groove and tongue. The trip lever 60 is slotted at 62 on the upper side of its hub portion, and a pin 63 depending from a crank arm 64 projects into said slot. The arm 64 is connected to an oppositely extending arm 65, both arms being supported by a bearing 66 so they may be swung in a plane parallel to shaft 43.

To accomplish this movement and to cause the lever 60 to assume selected positions, a pin 67 on the arm 65 engages a cam slot 68 in a disc 69 that is close to the top of casing 20. A stub shaft 70, to which said disc is attached, extends through the casing to a selector knob 71 (Figs. 1 and 5) which carries an index pointer 72 that overlies a circular time scale 73. When the knob 71 is turned to align the index 72 with the selected shutter speed on the scale 73, the cam slot 68 engages the pin 67 and swings the arms 65 and 64 about the bearing center 66, and the pin 63 moves trip lever 60 toward the right or left end of shaft 43.

As before mentioned, lever 60 is arranged to lift or turn with shaft 43, as is also detent 42 which holds front curtain 28 in "wound" position by engaging shoulder 44 on the end flange 45 of roller 29. Therefore, if the trip lever 60 is raised a required distance, the shaft 43 is rotated sufficiently to lift the hooked end of detent 42 over shoulder 44 on flange 45 of roller 29, and the front curtain 28 will be released.

To provide the required variable "lead" of the rear curtain in advance of the beginning of the downward movement of the front curtain, a series of detent actuators are provided to lift the depending end of trip lever 60 at the required time. These actuators consist of lugs projecting from the edges of discs 75, 76, 77, 78 and 79 that are free to revolve on shaft 35 and which lie between one drum 34a on said shaft and a fixed bearing 80 that serves as a guide for one of the tapes 33 in place of a flange on one drum 34a.

The lug 75a on disc 75 projects laterally into notch 53 in flange 54, so that when the hook 52 is raised out of said notch by the movement of release lever 49 and arm 56, the rotation of drum 34a carries disc 75 around with it. Lug 76a on disc 76 projects into the path of lug 75a, so that after the latter has moved through several degrees of arc the disc 76 begins to turn. Likewise in succession discs 77, 78 and 79 are picked up by the lugs 77a, 78a and 79a of the remaining discs.

Any one of the lugs 75a—79a is adapted to contact the underside of the hooked portion of trip lever 60 and to raise it, thus turning the detent shaft 43, which latter, in turning, raises the detent 42 which is fixed to it and releases the front curtain. The time interval between the release of the rear and front curtains is determined by the position of trip lever 60, and the further to the right (Fig. 1) this detent is, the greater will be the time interval or the wider the shutter "slot," due to the cumulative "pickup" of the selector discs 75—79.

On the winding movement of the shutter, the discs 75—79 are circumferentially spaced in given relative positions by successive engagement, first, of the lug 75a by the following edge of notch 53, then engagement of lug 76a by a lug 75b on disc 75, then engagement of lug 77a by lug 76b, etc.

To permit "bulb" exposures to be made, it is necessary to release the rear curtain and permit it to be wound on roller 32, thus fully uncovering apertures 26, and then to release the front curtain after the desired exposure interval, as determined manually by the operator, that is, the operator may depress lever 49, which frees the rear curtain, and when the lever is permitted to return to normal under the influence of spring 50, the front curtain will be released.

Means for accomplishing this result comprise a "bulb" detent 85, the hooked end 85a of which is adapted to engage a shoulder 86 in the disc 78, this disc being thicker than the others to afford room for said shoulder. Detent 85 is normally freed from the shoulder 86 by a light spring 87, although in Fig. 9 it is shown in engagement with said shoulder. This engagement is accomplished by means of a block 88, slideable on release shaft 46 and arranged to turn with said shaft, and having a flat extension 89 that is adapted to lie close to the back of detent 85 (Fig. 9) when the block is slid to the position of Fig. 6.

The latter movement occurs at the extreme end of the counter-clockwise rotation of selector knob 71 (Fig. 5), at which point a downwardly-projecting lug 90 on cam disc 69 contacts an upstanding lug 88a on the block 88, moving the latter toward the left (Fig. 6). When released shaft 46 is turned by depressing lever 49, the extension 89 swings detent 85 so that the hook 85a bears against the disc 78, and, when the latter has been carried around by the picking of discs 75, 76, and 77, the hook 85a engages shoulder 86.

Further rotation of the series of selector discs is thus prevented, and as the rear curtain at this time has moved far enough to uncover aperture 26, the latter remains uncovered until lever 49 is released.

This release movement permits shaft 46 to turn under the influence of spring 50, and to swing hook 85a away from shoulder 86. The rear curtain 31 then continues its movement under the influence of its spring 41, the disc 78 rotates, lug 78a strikes lug 79a, and the latter raises the trip lever 60 and detent 42, thus permitting the front curtain 28 to be wound on roller 30 and to again cover aperture 26.

In Fig. 11 a modified form of selector discs are shown, wherein the various lugs that are adapted to strike and lift detent 60 are on a series of discs 95, 96, 97, 98, 99, that are pinned at 100 to the drum 34a so that the drum and disc are in effect integral. This modification requires the roller 29 to be of such a diameter that one complete revolution thereof will be sufficient to move any of the lugs on the cylinder from the "wound" position up to and into contact with the hooked lever 60. Each of the two shutters are identical as to their operation and they are both under the control of a single releasing and turning device.

While I have described a preferred embodiment of my invention as applied to a duplex shutter for stereo cameras, it is obviously not limited to such an embodiment being equally useful for the more usual type of cameras utilizing a single objective. In such cases one of the shutters may be omitted, but in either case the control for the two curtains forming one shutter are exactly the same.

I claim:

1. In a photographic shutter, the combination, with a casing including exposure aperture therein, of shutter members adapted to cover and uncover said exposure apertures, two springs connected to the shutter members one for opening the exposure aperture and the other for closing the aperture, a control device including two latch members adapted to hold the springs inactive, a tripping device for releasing one latch, a lost motion connection between the first and second latches, said lost motion device comprising a plurality of revolvably mounted washers each having interengaging lugs whereby one may be turned by another when the lugs are brought into contact, at least some of the washers being provided with tripping lugs, a trip lever adapted to be operated by a tripping lug, and connections between the tripping lever and second latch for operating the latter by the former whereby one spring is operated after the other so that the shutter members are positively opened and closed.

2. In a photographic shutter, the combination, with a casing including exposure aperture therein, of shutter members adapted to cover and uncover said exposure apertures, two springs connected to the shutter members one for opening the exposure aperture and the other for closing the aperture, a control device including two latch members adapted to hold the springs inactive, a tripping device for releasing one latch, a lost motion connection between the first and second latches, said lost motion device comprising a plurality of revolvably mounted washers each having interengaging lugs whereby one may be turned by another when the lugs are brought into contact, at least some of the washers being provided with tripping lugs, a trip lever adapted to be operated by a tripping lug, and connections between the tripping lever and second latch for operating the latter by the former whereby one spring is operated after the other so that the shutter members are positively opened and closed, and a movable mount for the tripping lever on which the lever may be moved to engage a selected tripping lug to vary the duration of the lost motion between the actuation of the two springs.

3. In a photographic shutter, the combination, with a casing including exposure aperture therein, of shutter members adapted to cover and uncover said exposure apertures, two springs connected to the shutter members one for opening the exposure aperture and the other for closing the aperture, a control device including two latch members adapted to hold the springs inactive, a tripping device for releasing one latch, a lost motion connection between the first and second latches, said lost motion device comprising a plurality of revolvably mounted washers each having interengaging lugs whereby one may be turned by another when the lugs are brought into contact, at least some of the washers being provided with tripping lugs, a trip lever adapted to be operated by a tripping lug, and connections between the tripping lever and second latch for operating the latter by the former whereby one spring is operated after the other so that the shutter members are positively opened and closed, a movable mount for the tripping lever, means outside of the shutter casing for moving the tripping lever into position to engage a selected tripping lug whereby the time of exposure may be predetermined.

4. In a photographic shutter, the combination, with a casing including exposure aperture therein, of shutter members adapted to cover and uncover said exposure apertures, two springs connected to the shutter members, one for opening the exposure aperture and the other for closing the aperture, a control device including two latch members adapted to hold the springs inactive, a tripping device for releasing one latch, a lost motion connection between the first and second latches, said lost motion device comprising a plurality of revolvably mounted washers each having interengaging lugs whereby one may be turned by another when the lugs are brought into contact, at least some of the washers being provided with tripping lugs, a trip lever adapted to be operated by a tripping lug, and connections between the tripping lever and second latch for operating the latter by the former whereby one spring is operated after the other so that the shutter members are positively opened and closed, a movable mount for the tripping lever, a knob pivotally attached to the outside of the shutter casing and adapted to position the tripping lever to engage a selected tripping lug to determine the time of exposure.

5. In a photographic shutter, the combination, with a casing including exposure aperture therein, of shutter members adapted to cover and uncover said exposure apertures, two springs connected to the shutter members one for opening the exposure aperture and the other for closing the aperture, a control device including two latch members adapted to hold the springs inactive, a tripping device for releasing one latch, a lost motion connection between the first and second latches, said lost motion device comprising a plurality of revolubly mounted washers each having interengaging lugs whereby one may be turned by another when the lugs are brought into contact, at least some of the washers being provided with tripping lugs, a trip lever adapted to be operated by a tripping lug, and connections between the tripping lever and second latch for operating the latter by the former whereby one spring is operated after the other so that the shutter members are positively opened and closed, a moveable mount for the tripping lever, a knob pivotally attached to the outside of the shutter casing, a cam carried by the knob inside of the casing and engaging the trip lever to position it to engage a selected lug to determine the time of exposure.

6. In a photographic shutter, the combination, with a shutter casing having exposure apertures, of shutter members for opening and closing the exposure apertures comprising separate curtains, a separate power spring for each shutter member, means for simultaneously tensioning both springs, a latch for holding each spring under tension, means to manually trip one latch, means to automatically trip the second latch including a lost motion device, whereby one latch may be tripped a predetermined time after the other latch to produce an exposure, a plurality of rotatably mounted washers each having a radially projecting lug and each having interengaging lugs whereby each may turn independently of the other a predetermined distance and then may turn with the next washer, and means engaging a radial lug of any one of the plurality of washers for timing the tripping of the second latch to complete the exposure.

7. A timing device for shutters including shutter mechanism for opening and closing a shutter aperture and comprising two springs, one for opening the shutter mechanism and the other for closing the shutter mechanism, latches for holding the springs against movement, and a lost motion connection for controlling the relative operation of the latches, means for tripping one latch manually, said lost motion connection comprising a shaft, a plurality of lugs extending radially of the shaft, one of said lugs being adapted to turn therewith, said shaft being connected to and controlling the shutter opening spring, a movable member adapted to engage a selected lug, connections between the movable member and the second latch for tripping the latter after a time interval permitting the shutter closing spring to function.

8. A timing device for shutters including shutter mechanism for opening and closing a shutter aperture and comprising two springs, one for opening the shutter mechanism and the other for closing the shutter mechanism, latches for holding the springs against movement, and a lost motion connection for controlling the relative operation of the latches, means for tripping one latch manually, said lost motion connection comprising a shaft, a plurality of washers revolvably mounted thereon having interengaging lugs, at least one washer being interconnected with the shutter opening spring, each successive washer being adapted through the interengaging lugs to be driven by the driven lug after the lost motion is taken up, a movable member adapted to be positioned to engage a selected washer lug, and to be operated thereby, connections between the movable number and the closing spring latch for operating the latter by the former, for closing the shutter mechanism, and a setting member for positioning the movable member to vary the duration of time between the shutter opening and closing.

9. A timing device for shutters including a shutter mechanism for opening and closing a shutter aperture and comprising two springs, one for opening the shutter mechanism and the other for closing the shutter mechanism, latches for holding the springs against movement, and a lost motion connection for controlling the rotative operation of the latches, means for tripping one latch manually, said lost motion connection comprising a shaft, a plurality of rotatably mounted lugs projecting radially from said shaft, each lug being spaced axially from each of the other lugs, a member movable axially of the shaft and adapted to be positioned for engaging any one of the radially and axially spaced lugs and adapted to be actuated by a lug, connections between the movable member and the closing spring latch for operating the latter by the former for closing the shutter mechanism, and a setting member for positioning the movable member to vary the duration of exposure.

D'ARCY A. YOUNG, JR.